United States Patent
Borling

(10) Patent No.: US 6,186,278 B1
(45) Date of Patent: *Feb. 13, 2001

(54) BEARING GREASE FITTING AND ASSEMBLY

(75) Inventor: Al Borling, Valley City, OH (US)

(73) Assignee: MTD Products Inc, Cleveland, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/977,283

(22) Filed: Nov. 24, 1997

(51) Int. Cl.[7] ....................................... B60B 27/00
(52) U.S. Cl. ........................... 184/105.3; 384/322
(58) Field of Search .................. 184/45.1, 105.3, 184/105.1; 384/322, 397, 398, 291

(56) References Cited

U.S. PATENT DOCUMENTS

| | | | | |
|---|---|---|---|---|
| 832,877 | * | 10/1906 | Richards | 384/291 |
| 1,662,903 | * | 3/1928 | Schein | 384/291 |
| 4,576,488 | * | 3/1986 | Steiner et al. | 384/291 |
| 4,636,007 | * | 1/1987 | Persons | 384/474 |
| 4,890,939 | * | 1/1990 | Koschinat | 384/322 |
| 5,165,503 | * | 11/1992 | Hoffman | 184/105.3 |
| 5,174,839 | * | 12/1992 | Schultz et al. | 384/489 |
| 5,232,069 | * | 8/1993 | Siegrist | 184/105.3 |
| 5,395,171 | * | 3/1995 | Waskiewicz | 384/428 |
| 5,433,530 | * | 7/1995 | Waskiewicz | 384/206 |
| 5,456,535 | * | 10/1995 | Chen et al. | 384/291 |
| 5,551,530 | * | 9/1996 | Goettker | 184/45.1 |
| 5,964,325 | * | 10/1999 | Davison et al. | 384/145 |

FOREIGN PATENT DOCUMENTS

931578 * 2/1948 (FR) ............................ 384/397

OTHER PUBLICATIONS

Database search.

* cited by examiner

Primary Examiner—David A. Bucci
Assistant Examiner—Chong H. Kim
(74) Attorney, Agent, or Firm—Emerson & Associates; Roger D. Emerson; Marcella R. Louke

(57) ABSTRACT

A bearing grease fitting for directing grease into an interior portion of a wheel hub. The bearing grease fitting is an integral piece having a protrusion with a nippled end. The grease fitting has a first portion, which seats within a wheel hub. Grease is transferred from a grease gun through the protrusion to an interior portion of a wheel, such as an axle. A bearing grease fitting assembly consists of the grease fitting together with the wheel hub.

6 Claims, 3 Drawing Sheets

BEARING GREASE FITTING AND ASSEMBLY

BACKGROUND OF THE INVENTION

I. Field of the Invention

This invention relates to a bearing grease fitting that seats within a wheel hub, and more particularly, to a plastic bearing grease fitting that eliminates the need to drill through the wheel or hub in order to grease the axle or wheel bearing.

II. Description of the Related Art

The prior art uses grease fittings that are typically inserted in threaded bores within a wheel hub or the wheel itself. Grease fittings are usually manufactured of metal and are attached to a grease applicator. The grease applicator is typically a grease gun that injects grease through the grease fitting. The grease passes through the fitting and into the hub to lubricate the axle or bearings.

The cost to manufacture the wheel or hub is significantly increased by the need of drilling and tapping a hole to accept the grease fitting. Typically, a hole is drilled and tapped through the wheel rim or hub and the metal grease fitting is thereafter tapped into place. This is a labor-intensive manufacturing process. In addition, expensive drills and taps often break during this process. This leads to a further increase in the cost of the wheel.

Recently, plastic grease fittings have been used on a wheel. The plastic grease fitting eliminates the need for welding and snaps into the wheel rim or hub hole. However, one drawback of the plastic grease fitting is that the grease gun can twist off the grease fitting when applied. This twisting causes the plastic grease fitting to become "unsnapped" from the wheel thereby preventing the wheel from being properly greased.

The present invention contemplates a new and improved bearing grease fitting which is simple in design, effective in use, and overcomes the foregoing difficulties and others while providing better and more advantageous overall results.

SUMMARY OF THE INVENTION

A bearing grease fitting for directing grease into an interior portion of a wheel is disclosed. The bearing grease fitting has a first and a second end, a first bore with an inner periphery, a first portion that has a first outer periphery, a second portion that has a protrusion and a second outer periphery. The protrusion has a top surface and a grease delivery bore. The grease delivery bore extends from the top surface into the first bore, whereby the first portion, the second portion, the protrusion, and the grease delivery bore are integral. The bearing grease fitting directs grease to the interior portion of the wheel contained within the first bore. Typically, the interior portion of the wheel is an axle contained within the first bore of the bearing grease fitting. Preferably, the bearing grease fitting is integral and made by injection molding.

The inner periphery of the first bore further comprises a flow path. The flow path extends from the grease delivery bore at the inner periphery to the first end, whereby the grease flows along the flow path to the interior portion of the wheel hub. The grease delivery bore extends along a centerline that passes through the protrusion. The protrusion also extends outwardly from the second outer periphery. Preferably, the protrusion extends outwardly at an angle between 15° and 90° measured from a centerline passing through the center of the first bore to a centerline passing through the protrusion.

A bearing grease fitting assembly comprises the wheel hub and the bearing grease fitting described above. An alternative embodiment of the bearing grease fitting has the second outer periphery of the first portion equal to the first outer periphery of the first portion.

In accordance with the present invention, a new and improved bearing grease fitting is provided which seats within the wheel hub.

One object of the present invention is to provide a bearing grease fitting that eliminates a hole within a wheel rim or hub.

Another object of the present invention is to combine a grease fitting and bearing thereby eliminating the total number of parts.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and herein.

DESCRIPTION OF THE PREFERRED EMBODIMENT

Figure 1:
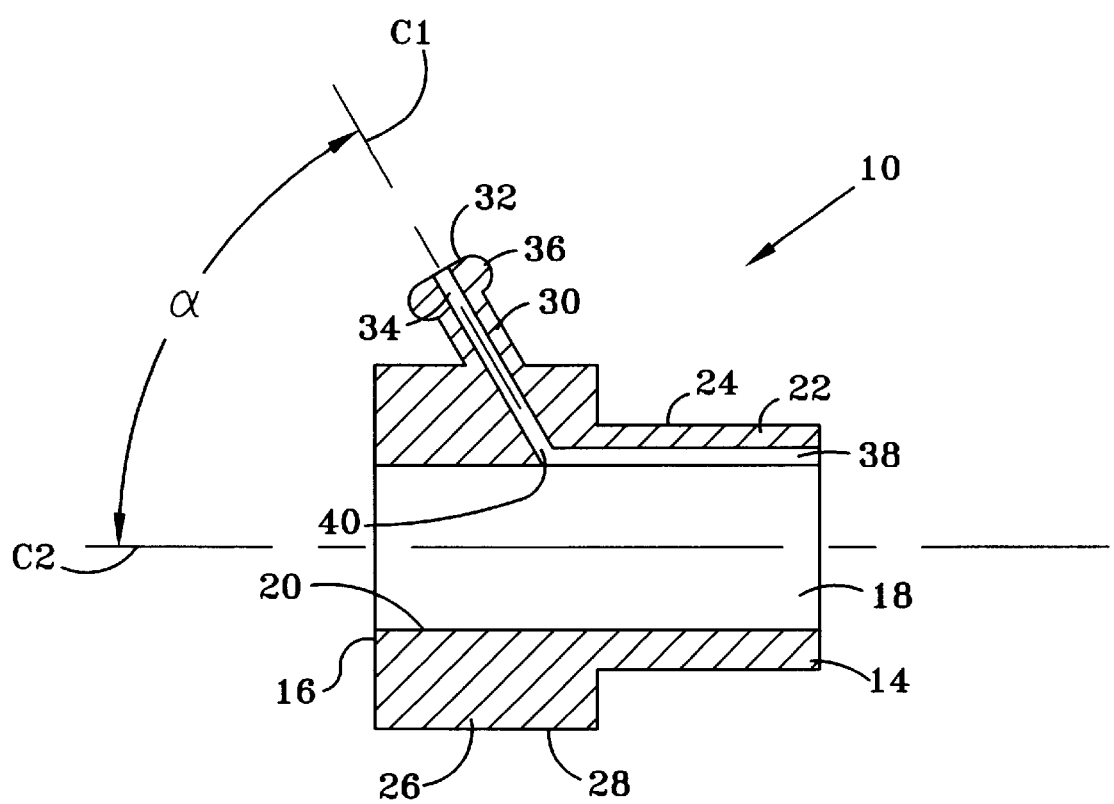
FIG. 1 is a side sectional view of a bearing grease fitting.

Referring now to the drawings, which are for purposes of illustrating a preferred embodiment of the invention only, and not for purposes of limiting the invention, FIG. 1 shows a bearing grease fitting 10. The bearing grease fitting 10 has a first end 14 and a second end 16. A first bore 18 extends through the first end 14 and the second end 16. The first bore 18 has an inner periphery 20 that is constant in diameter throughout the first end 14 and the second end 16. The first bore 18 accepts an axle 100.

The bearing grease fitting 10 has a first portion 22. The first portion 22 has a first outer periphery 24. The first portion 22 terminates into second portion 26. The first portion 22 has an interference fit, or an otherwise tight fit, within the hub bore 52 of the wheel hub 50. The second portion 26 has a second outer periphery 28. In the preferred embodiment, the second outer periphery 28 is greater than the first outer periphery 24. However, bearing grease fitting 10 could have only one portion (i.e., second outer periphery 28 is equal to first outer periphery 24) and still be within the scope of this invention. The second portion 26 extends beyond the hub 50.

The second portion 26 has a protrusion 30 that extends outwardly from the second outer periphery 28. The protrusion 30 has a top surface 32 and a grease delivery bore 34. The grease delivery bore 34 is open at the top surface 32 of protrusion 30. The grease delivery bore 34 extends substantially through the protrusion 30 and second portion 26 to the first bore 18. In the preferred embodiment, the protrusion 30 extends substantially outwardly from the second outer periphery 28, so that the grease delivery bore 34 extends substantially outwardly from the second outer periphery 28. The protrusion 30, in its preferred embodiment, is a nippled post having a nippled end 36. The nippled end 36 is suitable for an associated, conventional grease gun (not shown) to inject grease into the grease delivery bore 34. The grease delivery bore 34 is preferably centered within the protrusion 30 and has a centerline $C_1$ through its center. The bearing grease fitting 10 has a centerline $C_2$ that runs through its center, i.e., through the center of the first bore 18. The protrusion 30 is angularly oriented extending from the second portion 26. With reference to FIG. 1, this angle is denoted as $\alpha$, which is measured from the centerline $C_2$ of the fitting 10 to the centerline of $C_1$ of the grease delivery bore 34. In the preferred embodiment, the angle $\alpha$ is between 15° and 90°. In its most preferred embodiment, the angle $\alpha$ is 60°.

Figure 2:
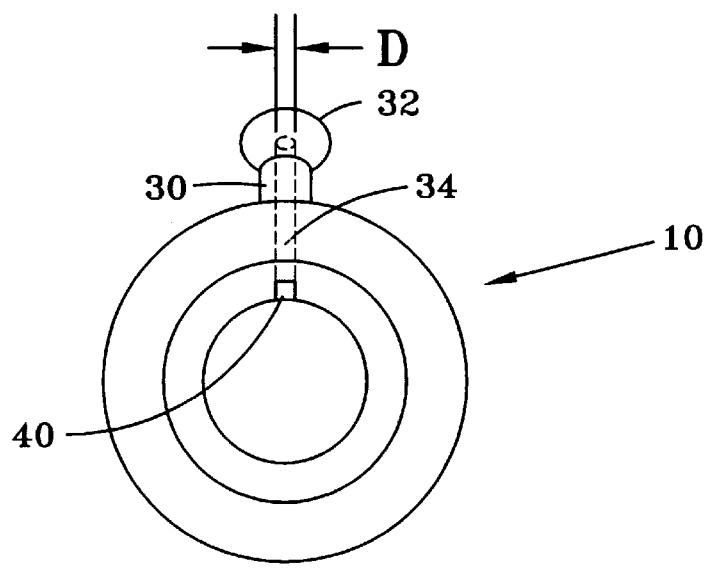
FIG. 2 is an end view of the bearing grease fitting.
Figure 3:
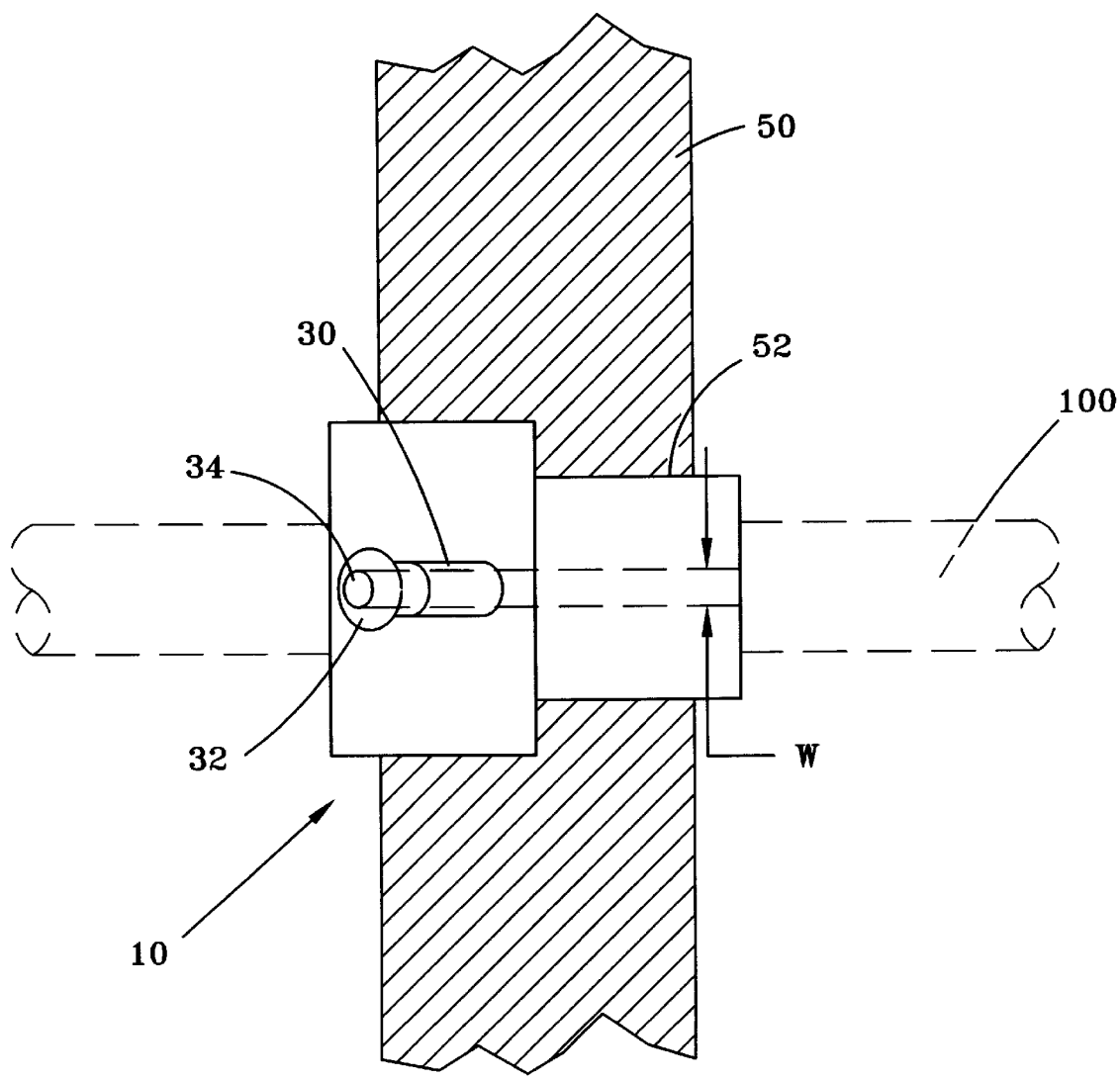
FIG. 3 is a sectional view of a bearing grease fitting assembly showing the bearing grease fitting seated within a wheel hub; and, FIG. 4 is a partial sectional view of a wheel showing the bearing grease fitting assembly within the wheel.

With reference to FIGS. 1 and 3, the first inner periphery 20 of the first bore 18 has a flow path 38 which extends from the grease delivery bore exit 40. With reference to FIGS. 2 and 3, in its preferred embodiment, the flow path 38 has a width W that is equal to the diameter D of the grease delivery bore 34. However, the width W can vary and be greater than or less than diameter D of the grease delivery bore 34.

FIG. 3 shows the bearing grease fitting assembly 12 comprising the bearing grease fitting 10 and the wheel hub 50. In its preferred embodiment, the bearing grease fitting 10 is press fit within a hub bore 52. The hub bore 52 has a diameter that is slightly less than the first outer periphery 24 of the bearing grease fitting 10.

Figure 4:
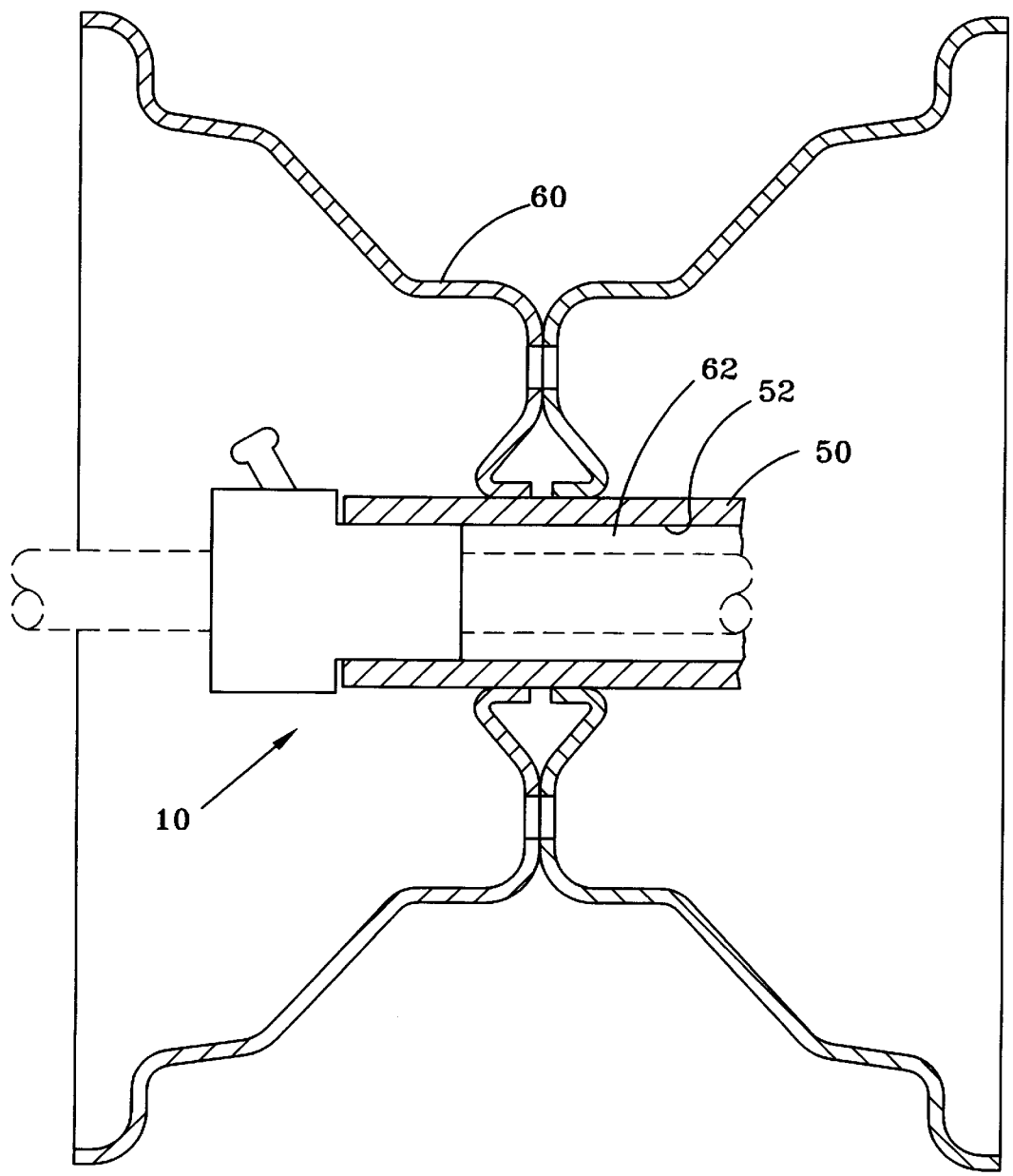

FIG. 4 shows a wheel 60 having the bearing grease fitting assembly 12 seated within the axle bore 62. The wheel hub 50 has an interference or tight fit with the axle bore 62. Preferably, the hub 50 is press-fit into the axle bore 62 and welded therein. To provide grease to the axle 100, a grease gun (not shown) is attached to the protrusion 30 at its nippled end 36. The grease then flows through the grease delivery bore 34 and along the flow path 38 to thereby insert the grease to the axle 100.

The bearing grease fitting 10 also acts as a bearing for the axle 100. The axle 100 rides within the first bore 18 of the bearing grease fitting 10. Therefore, the need for a separate bearing and grease fitting are eliminated. However, a bearing could be used in place of the axle 100 and grease provided to that bearing.

This invention is suitable for any type of grease fitting application with a rotary shaft inside a stationary housing, a rotary material between concentric parts and all wheel hubs. The bearing grease fitting 10 is preferably an integral part. Preferably, it is made of a plastic, such as Nylatron®, and thus is inexpensive and easy to manufacture and install. The bearing grease fitting 10 is generally a cylindrical shape.

The above-described embodiment of the invention provides a very effective and inexpensive means of supplying grease to the wheel bearing. It also eliminates the need to drill a hole within the hub 50 and/or wheel 60 to provide grease to the axle 100.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A bearing grease fitting adapted for supporting an associated rotatable axle consisting of:

a body having first and second ends and an axial bore therein extending between first and second ends and defining a cylindrical inner periphery, a first portion encompassing said first end and including a first co-axial cylindrical exterior periphery having a first outer diameter, and a second portion adjacent said first portion having a second co-axial cylindrical exterior periphery having a second outer diameter greater than said first diameter;

a protrusion adapted for use with an associated grease gun, said protrusion extending from said second cylindrical exterior periphery and being angled toward said second end, said protrusion having a grease delivery bore therein opening through a top surface of said protrusion and communicating with said axial bore; and, said inner periphery having a linear flow path therein extending from said grease delivery bore to said first end of said body.

2. The bearing grease fitting of claim 1 wherein said protrusion is angled from 15° to 90° as measured from a centerline passing through said axial bore to a centerline of said grease delivery bore.

3. The bearing grease fitting of claim 1 wherein said flow channel has a width W being substantially equivalent to a diameter D of said grease delivery bore.

4. In combination, a wheel hub, a rotatable axle, and a bearing grease fitting, said combination comprising:

a wheel hub having an axial hub bore therein, said axial hub bore defining an inner hub surface;

an axle; and, a bearing grease fitting comprising a body having first and second ends and an axial bore therein extending between first and second ends and defining a cylindrical inner periphery, said body including a first portion encompassing said first end and including a first co-axial cylindrical exterior periphery having a first outer diameter, and a second portion adjacent said first portion having a second co-axial cylindrical exterior periphery having a second outer diameter greater than said first diameter; a protrusion extending from said second cylindrical exterior periphery and being angled toward said second end, said protrusion having a grease delivery bore therein extending from a top surface of said protrusion and communicating with said axial bore; wherein said inner periphery has a flow channel therein extending from said grease delivery bore to said first end of said body;

wherein said axle extends through said axial bore of said bearing grease fitting and said first portion of said bearing grease fitting is received within said axial hub bore.

5. The combination of claim 4 wherein said protrusion is angle from 15° to 90° as measured from a centerline passing through said axial bore to a centerline of said grease delivery bore.

6. The combination of claim 4 wherein said flow channel has a width W being substantially equivalent to a diameter D of said grease delivery bore.

* * * * *